Jan. 9, 1951        A. TOWNHILL        2,537,174
COOLANT FILLED PISTON
Filed Dec. 15, 1948
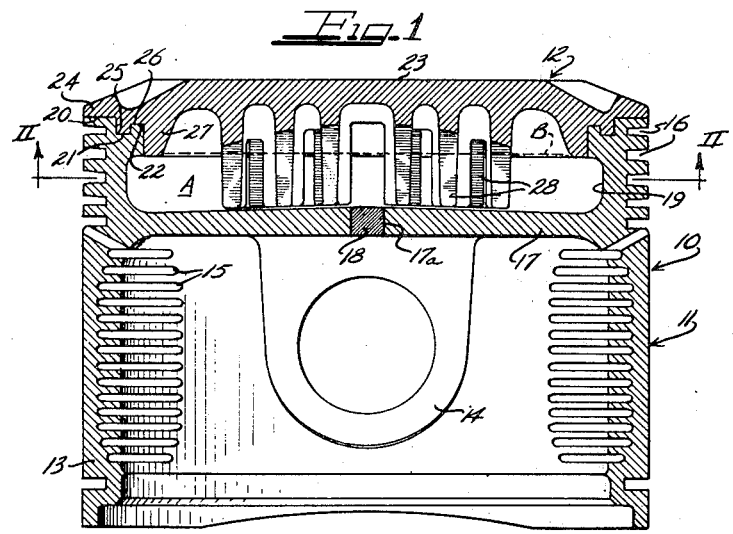
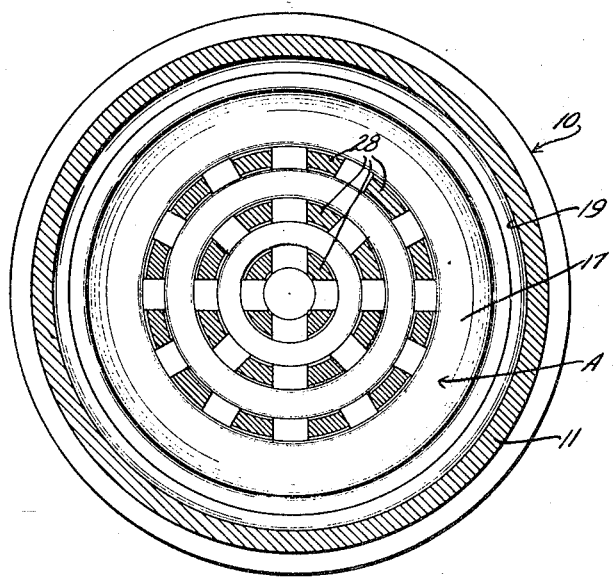
Inventor
ARTHUR TOWNHILL Patented Jan. 9, 1951

2,537,174

UNITED STATES PATENT OFFICE 2,537,174

COOLANT FILLED PISTON

Arthur Townhill, Cleveland, Ohio, assignor to Thompson Products, Inc., Cleveland, Ohio, a corporation of Ohio Application December 15, 1948, Serial No. 65,418

6 Claims. (Cl. 123—41.16)

The present invention relates to a coolant filled piston and more particularly to a piston having a body of coolant material disposed beneath the piston head for increasing heat transfer efficiency of the piston.

Pistons for internal combustion engines become heated during operation of the engine and in certain types of engines, such as aircraft engines, where operating temperatures within the combustion chambers are relatively high, the piston may become sufficiently heated to cause undesired detonation of fuel within the engine prior to proper spark ignition.

In order to prevent the heating of the pistons to detonation temperature, various types of coolant filled pistons have been proposed. In general, such pistons are provided with an internal cavity directly underlying the piston head, the cavity being filled with a coolant medium, such as sodium, to increase the heat transfer efficiency of the piston in removing heat from the piston head. However, in the prior art pistons, the provision of the cavity has seriously weakened the piston structure, particularly the piston head, and frequent piston failure during use has been encountered.

The present invention now provides an improved type of coolant filled piston in which a body of normally solid coolant is sealed within a cavity disposed directly beneath the piston head, the piston being provided with means for reinforcing the head. More particularly, in the present invention, the skirt and body portion of the piston are provided with an upper recess closed by a separate piston head portion secured thereto by suitable means. The separate piston head portion carries a plurality of depending ribs formed integrally with the head and extending into the recess for contacting the body of coolant disposed therein. The ribs formed integrally with the head function to effectively transfer heat from the piston to the body of coolant so that the coolant is in molten condition prior to the attainment of detonation temperatures within the combustion chamber.

Further, the ribs depending into the sealed recess serve to strengthen the piston head. The ribs, formed integrally with the head extend into closely spaced relation to that portion of the piston body forming the lower extremity of the sealed coolant-receiving cavity. When operating temperatures are reached within the engine, the ribs extending into the coolant become heated and undergo thermal expansion to contact the adjacent wall of the piston body to effectively serve as reinforcing means for the central portion of the piston head. The ribs are so formed that reinforcing contact is established at operating temperatures without, however, forming a bulge in the piston head due to over-expansion of the ribs.

It is, therefore, an important object of the present invention to provide an improved type of coolant filled piston having means for reinforcing the piston head when the piston is subjected to operating temperatures.

Another important object of the present invention is to provide a coolant filled piston for internal combustion engines in which separate piston skirt and head portions are assembled to form a cavity directly underlying the piston head and adapted to receive a heat transfer medium, the piston head carrying means extending into said recess for reinforcing the central portion of the head.

It is a further object of the present invention to provide a coolant filled piston for internal combustion engines, the piston having a sealed cavity formed therein adapted to receive coolant material, the cavity directly underlying the piston head, the piston head having ribs formed integrally therewith for extending into said recess for contacting the piston skirt portion to reinforce the piston head during operation of the engine.

A still further important object of the present invention is to provide a coolant filled piston comprising a body and skirt portion having a recessed upper section, a head section secured to the body portion and cooperating therewith to close the recess formed in the body portion, and ribs formed integrally with the piston head and extending into the recess for contact with the body of coolant material contained therein, the ribs serving to increase heat transfer efficiently from the piston head to the body of coolant and also serving to reinforce the piston head upon expansion of the ribs into contact with the piston body portion when the piston attains engine operating temperatures.

Other and further important objects of this invention will be apparent from the disclosures in the specification and the accompanying drawings.

On the drawings:

Figure 1 is a vertical cross-sectional view of piston of the present invention and Figure 2 is a cross-sectional view taken along the plane II—II of Figure 1.

As shown on the drawings:

In each figure of the drawing, reference numeral 10 refers generally to a piston of the present invention comprising a piston body and skirt portion 11 and a piston head 12.

The piston body portion 11 is formed with a cylindrical skirt wall 13 carrying integrally formed wrist pin bosses 14. Arcuate grooves 15 are formed in the inner face of the skirt between the diametrically opposed bosses 14 to increase the head transfer efficiency of the skirt wall.

Peripheral piston ring grooves 16 are provided in the upper portion of the body 10 formed as a continuation of the skirt walls 13. A transversely extending wall 17, having a central circular opening 17a normally closed by plug 18, is provided in body portion 10 to separate the upper grooved portion and the lower skirt portion of the piston. Wall 17 cooperates with interior wall surfaces 19 of the upper grooved portion of body 11 to define open topped recess A. The terminal edge of the upper grooved portion of body 11 is provided with an annular, flat peripheral rim surface 20, an annular groove 21 spaced inwardly of surface 20, and an inner annular ridge 22 adjacent groove 21.

Piston head 12 is formed with a flat upper head surface 23, a lower peripheral surface 24 mating with surface 20, a radially inward depending flange 25 adapted to fit snugly in peripheral groove 21 of body portion 11, and an inner annular recess 26 adapted to receive ridge 22. A second depending annular flange 27 is placed radially inward from recess 26 to fit snugly within the circular aperture formed in the upper extremity of body portion 11. Head 12 thus fits snugly over body portion 11 to close the open topped recess A. The head 12 may be secured in position by any suitable means, as by silver soldering or welding to seal recess A, thus forming a sealed cavity directly underlying the head 12.

The under surface of head 12 is provided with a plurality of dependent ribs 28 extending downwardly in recess A into closely spaced relation with the upper surface of transverse wall 17. The ribs 28 are preferably formed as arcuate segments of spaced concentric rings, as illustrated in Figure 2, depending from the central portion of the head.

Head 12 is preferably forged to shape and as forged carries a plurality of dependent, concentric annular flanges which are subsequently slotted, as by milling, to form the separate ribs 28 bonded integrally to head 12.

As hereinbefore stated, ribs 28 extend into closely spaced relation to transverse wall 17 following assembly of body portion 11 and head 12, the sealed cavity formed upon assembly being adapted to receive a body of coolant maintained in closely spaced relation to head 12 and with the ribs 26 extending into contact with the coolant. The sealed cavity may suitably be filled by means of plug 18 with a suitable coolant as, for example, with sodium which becomes molten at engine operating temperatures.

Preferably, the piston cavity is filled only partially with coolant, as to level B as indicated in Figure 1. By only partially filling the cavity, the coolant is capable of random movement within the cavity of effectively transfer heat from the piston head to the piston body. The ribs 28, extending into the body of solid coolant and being formed integrally with the head 12, effectively function to transfer heat readily from the piston head to the body of solid coolant. Actually, it has been found that heat transfer from head 12 is so efficient that the body of coolant is completely molten at head temperatures far below detonation temperatures within the engine so that no detonation whatsoever can occur within the combustion chamber.

Ribs 28, being in contact with molten coolant at elevated temperatures, undergo thermal expansion and the length of the ribs is such that the ribs extend, after being brought to engine operating temperature, into contact with the upper surface of transverse wall 17. For example, it has been found that the gap between the lower extremities of the ribs 28 and the upper surface of wall 17 may vary from 0.005 to 0.009 inch depending upon the length of the rib and the differential temperature between room temperature and the operating temperature to which the piston is subjected. The ribs thus serve the additional function of supporting head 12 and particularly the unsupported span of the central head portion necessarily formed by the provision of the coolant cavity.

Thus, it will be readily understood by those skilled in the art that I have provided an improved type of coolant filled piston which not only effectively transfers heat from the piston head but also reinforces the central piston section at operating temperatures so that the piston head is not weakened by the provision of a body of molten coolant disposed therebeneath.

It will, of course, be understood that various details of construction may be varied without departing from the principles of this invention, and it is, therefore, not the purpose to limit the patent granted hereon otherwise than necessitated by the scope of the appended claims.

I claim as my invention:

1. A coolant filled piston for an internal combustion engine comprising a body portion having a recess formed in one face thereof with a bottom wall extending thereacross, a piston head secured to said body portion to overlie said recess in spaced parallel relation to said bottom wall and cooperating with the body portion to provide a sealed cavity within said piston for receiving a body of coolant, and means extending into said cavity from said head to increase the efficiency of said coolant in transferring heat from said piston head, said means contacting said body portion at engine operating temperatures to reinforce said head without causing said head to bulge from said body portion.

2. A coolant filled piston for an internal combustion engine comprising a piston body and skirt portion having a recess formed in one end face thereof, a piston head adapted to be secured to said body closing said recess to form a sealed cavity adapted to receive a body of coolant therein, and a plurality of ribs formed integrally with said head portion to extend into closely spaced relation to said body portion and into heat transfer relation with the body of coolant confined in said cavity to increase heat transfer efficiency of said piston, said ribs being thermally expansible at engine operating temperatures to contact said body portion.

3. A coolant filled piston comprising an open ended body portion, a transverse wall mounted in said body portion to form a pair of separated recesses in said body, a piston head adapted to be secured to said body portion and extending thereacross parallel to said transverse wall to close one of said recesses thereby forming a sealed cavity in direct communication with said piston head, and a plurality of ribs formed integrally with said head portion and extending into said cavity into closely spaced relation to said transverse wall, said ribs being thermally expansible into contact with said wall to serve as reinforcing means for said head at those temperatures to which said piston is subjected when in use.

4. In a coolant filled piston for an internal combustion engine having a skirt portion and a head portion defining an interior coolant cavity adapted to receive a body of coolant, means for reinforcing said piston head including a plurality of elongated ribs carried by said head and depending therefrom for immersion in said body of coolant contained in said cavity, said ribs being linearly expanded into contact with said skirt portion to reinforce said head only upon operation of said engine and the subjection of said piston to relatively elevated temperatures, to thereby reinforce said head in use without causing bulging of the head from said skirt portion.

5. In a piston having cooperating body and head portions defining a sealed cavity closely underlying said head portion, means for reinforcing said head including a plurality of spaced ribs formed integrally with said head and extending into said cavity for contact with a body of coolant in said cavity, said ribs being expanded to contact said body portion when said piston is heated to engine operating temperature to reinforce the head portion overlying said cavity.

6. In a piston having a body portion formed with an open topped recess and a separate head portion secured to said body portion with a central section overlying said recess to close the same, means for reinforcing said central head section comprising ribs formed integrally with said head as alternate segments of spaced concentric rings, said ribs depending from said central head portion for contacting a body of coolant contained in said recess and being thermally expansible to bear against said body portion, whereby upon subjecting said piston to elevated temperatures said ribs are expanded into load bearing contact with said body portion to reinforce said central head section.

ARTHUR TOWNHILL.

REFERENCES CITED

The following references are of record in the file of this patent:

UNITED STATES PATENTS

| Number | Name | Date |
|---|---|---|
| 1,155,244 | Gorgensen | Sept. 28, 1915 |
| 1,228,708 | Rich | May 29, 1917 |
| 1,292,882 | Riedler | Jan. 28, 1919 |
| 1,363,708 | Bennis | Dec. 28, 1920 |
| 1,953,109 | Heron | Apr. 3, 1934 |
| 2,472,288 | Endsley et al. | June 7, 1949 |

FOREIGN PATENTS

| Number | Country | Date |
|---|---|---|
| 305,424 | Germany | of 1918 |